Nov. 6, 1956  R. POWERS  2,769,530
DEFLECTOR FOR USE WITH CONVEYOR
Filed Oct. 11, 1955  3 Sheets-Sheet 1

INVENTOR.
RICHARD POWERS
BY
ATTORNEYS

Nov. 6, 1956  R. POWERS  2,769,530
DEFLECTOR FOR USE WITH CONVEYOR
Filed Oct. 11, 1955  3 Sheets-Sheet 3

INVENTOR.
RICHARD POWERS
BY
ATTORNEYS

2,769,530

DEFLECTOR FOR USE WITH CONVEYOR

Richard Powers, Broomall, Pa., assignor to Bulletin Company, Philadelphia, Pa., a corporation of Pennsylvania Application October 11, 1955, Serial No. 539,740

5 Claims. (Cl. 198—188)

This invention relates to a deflector and, more particularly, relates to a deflector useful in connection with conveyors for deflecting an article from one conveyor to another conveyor.

Deflectors have been used heretofore with conveyors in order to direct an article from one conveyor to another conveyor. They have in general, however, been deficient in that they cannot be operated with sufficient rapidity or they are difficult to operate without causing jams. Thus, for example, in connection with the conveyance of newspaper bundles, there has been utilized a vertical acting deflector. This type of deflector is troublesome to operate since it is difficult to prevent a deflector from moving downwardly on top of a newspaper bundle and hence causing the bundles to jam up on the conveyor. Greater selectivity is achieved with the deflector of this invention since, immediately after the deflector commences to retract, it will not deflect but merely hold back the next bundle on the conveyor until this bundle is permitted to pass freely.

A broad object of this invention is to provide a deflector for use in conjunction with conveyors which may be rapidly manipulated and which, irrespective of the skill of the operator, will not cause jams. This and other objects of this invention will be apparent on reading the following description in conjunction with the drawings in which.

Figure 1:
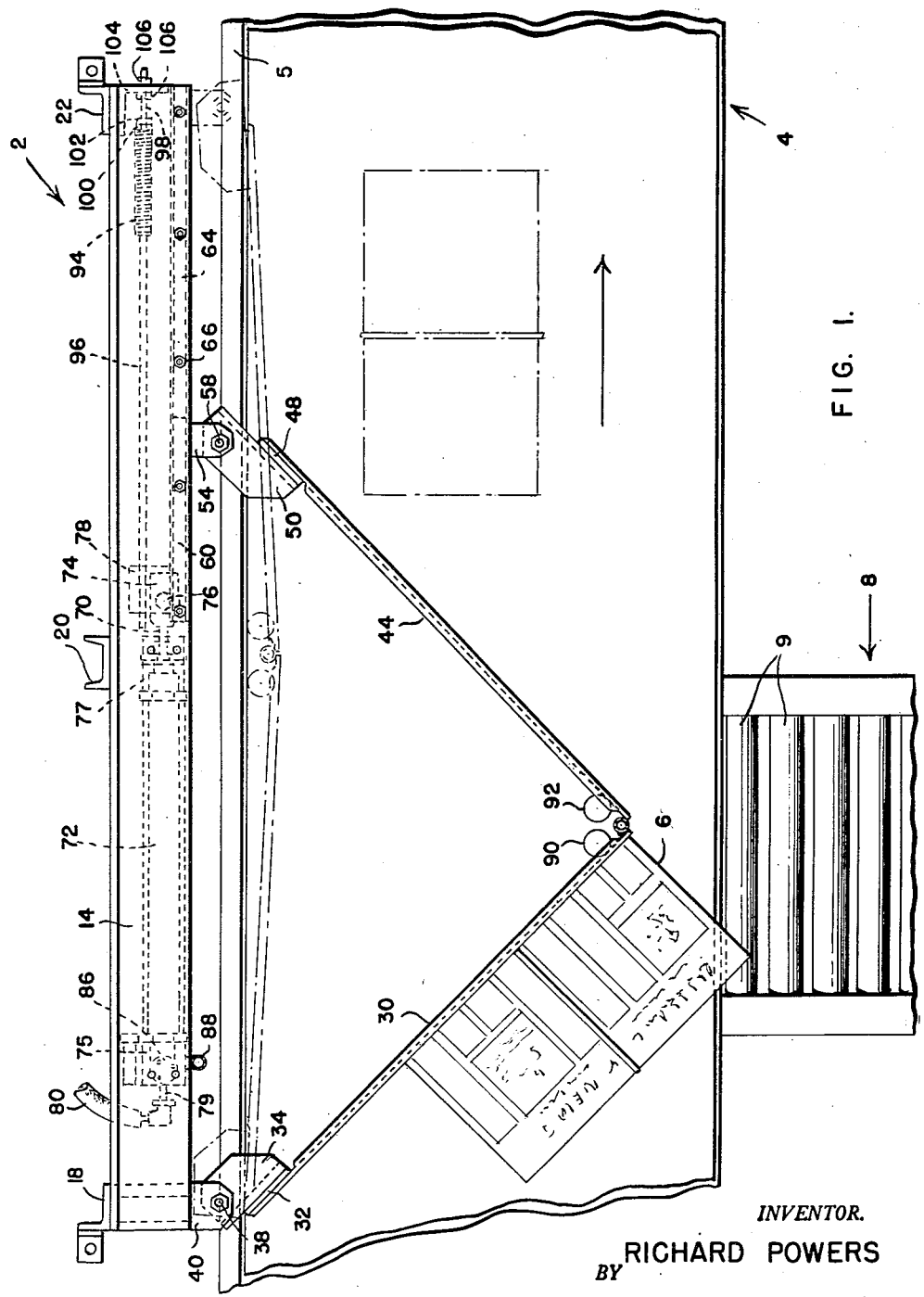
Figure 1 is a plan view of a deflector in accordance with this invention.

Referring now to Figure 1, a deflector 2 in accordance with this invention is mounted adjacent a belt conveyor 4 which has an upstanding guide rail 5 and which is adapted to convey, for example, a newspaper bundle 6. A discharge conveyor 8 having rollers 9 is substantially perpendicular to conveyor 4.

Figure 2:
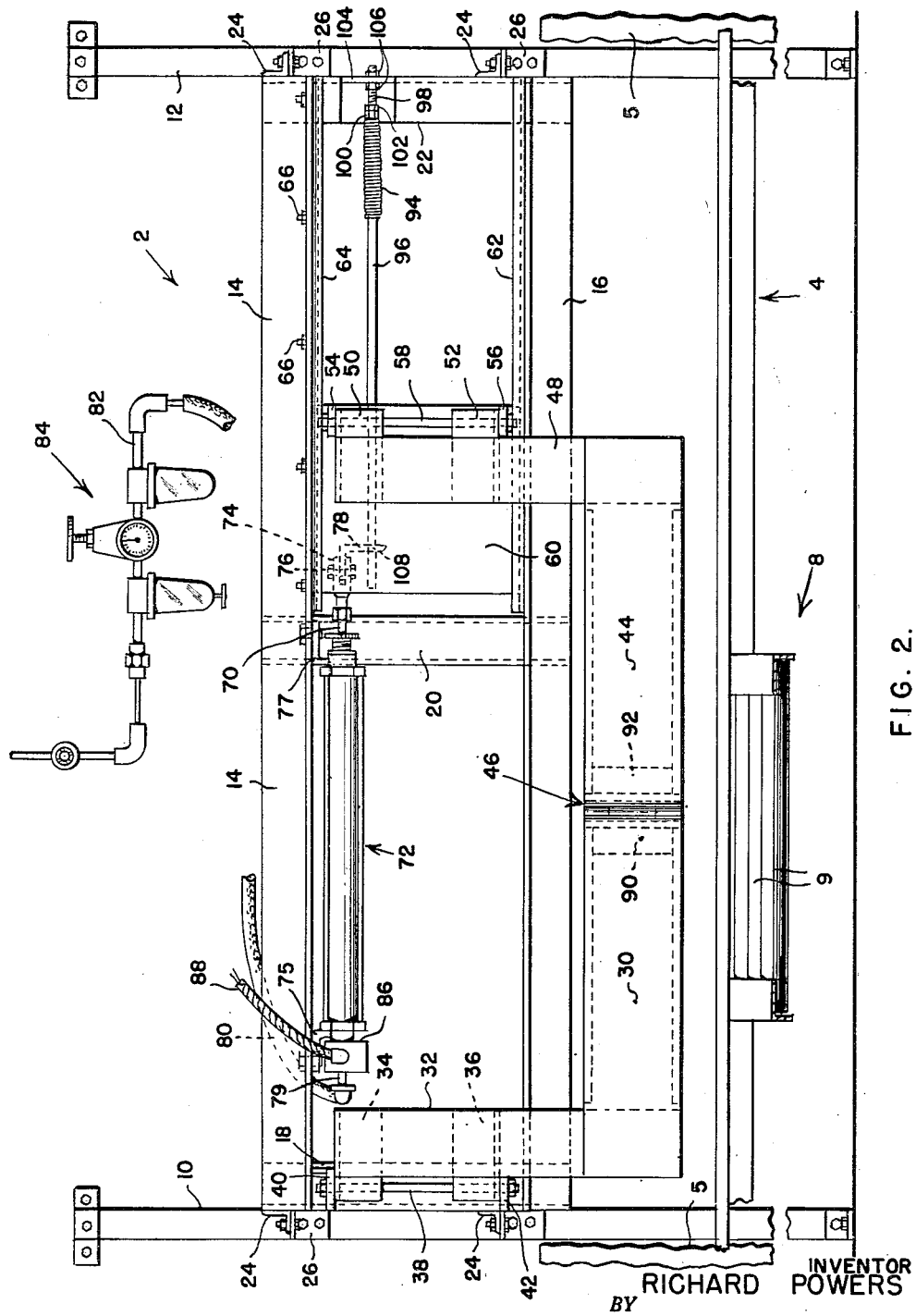
Figure 2 is a front elevation of the deflector of Figure 1.

As shown in Figure 2, the deflector 2 has a metal frame having vertical standards 10 and 12 and transverse L-shaped frame members 14 and 16. Vertical frame members 18, 20 and 22 are welded to transverse frame members 14 and 16. Brackets 24, welded respectively to vertical frame members 18 and 22, are bolted to brackets 26 which in turn are bolted respectively to vertical standards 10 and 12.

A channel-shaped deflector arm 30 has its outer end welded to a vertical plate 32. Plate 32 has welded thereto hinge members 34 and 36 through which a hinge bolt 38 passes. Hinge bolt 38 also passes through hinge brackets 40 and 42 which are welded to transverse frame members 14 and 16 respectively.

A second channel-shaped deflector arm 44 has its inner end hingedly secured to the inner end of deflector arm 30 as shown at 46. The outer end of arm 44 is welded to a vertical plate 48. A pair of hinge members 50 and 52 are welded to plate 48 and are mounted between hinge brackets 54 and 56. A hinge bolt 58 passes through hinge bracket 54, hinge member 50, hinge member 52 and hinge bracket 56.

Hinge brackets 54 and 56 are welded to a slide 60. Slide 60 is mounted in lower channel track 62 which is welded to transverse frame member 16 and in upper channel track 64 which is secured to transverse frame member 14 by countersunk bolts 66. Slide 60 is connected to plunger rod 70 of air operated double acting ram 72 by means of L-shaped bracket 78 which is welded to slide 60 and which is secured to rod 70 by a clevis 74 held by bolt 76.

Ram 72 is secured to transverse frame member 14 by means of brackets 75 and 77, respectively, which are welded to ram 72 and bolted to member 14. Ram air supply line 79 is fed by a flexible hose 80 which in turn is connected to compressed air line 82 which is provided with a pressure regulator 84. Ram air supply line 79 supplies a 2-position solenoid operated valve 86 which is adapted to control the flow of air to the appropriate end of the ram cylinder in a manner which is well known to the art and need not be detailed here. A line 88 leads from valve 86 to a switch and power supply line (not shown). The outward stroke of the ram is of sufficient length to carry deflector arms 30 and 34 to a position adjacent conveyor rail 5 but not long enough to have the arms lie in a single vertical plane. Thus the arms lie in vertical planes which are slightly out of line in order to provide for the ready hinging of the arms when the ram is retracted.

The deflector in accordance with this invention is also provided with a variety of buffer means. Rubber rolls 90 and 92 are secured by a pressed fit to arms 30 and 34 adjacent the inner hinged ends. When the arms are moved to the non-operative position, the rolls 90 and 92 act to buffer the arms as they move against rail 5. They thus reduce noise and also act to prevent the arms from being carried so as to lie in a single vertical plane should the stroke of the ram be a little too long.

A buffer compression coil spring 94 is also provided. This spring is mounted on a rod 96. Rod 96 has a threaded end 98 with a pair of nuts 100 and 102 which act to limit the travel of spring 94. Rod 96 is secured to bracket 104 by nuts 106 placed on opposite sides of the bracket. The other end of rod 96 passes through an opening 108 in bracket 78.

Figure 3:
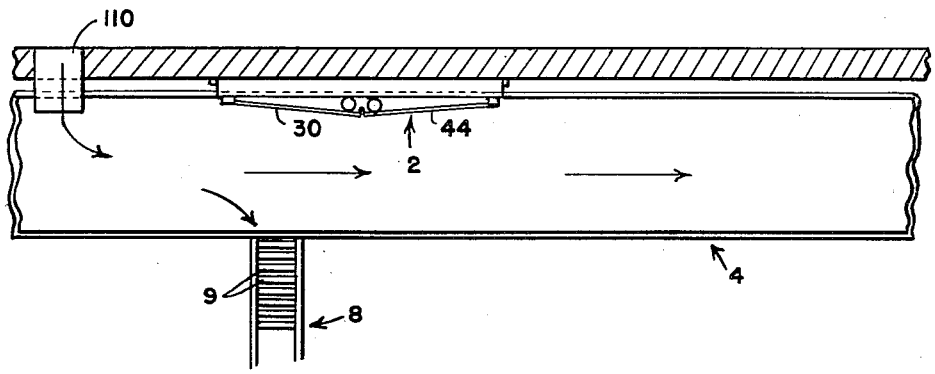
Figure 3 is a schematic view of the deflector of Figure 1 associated with a conveyor system.
Figure 4:
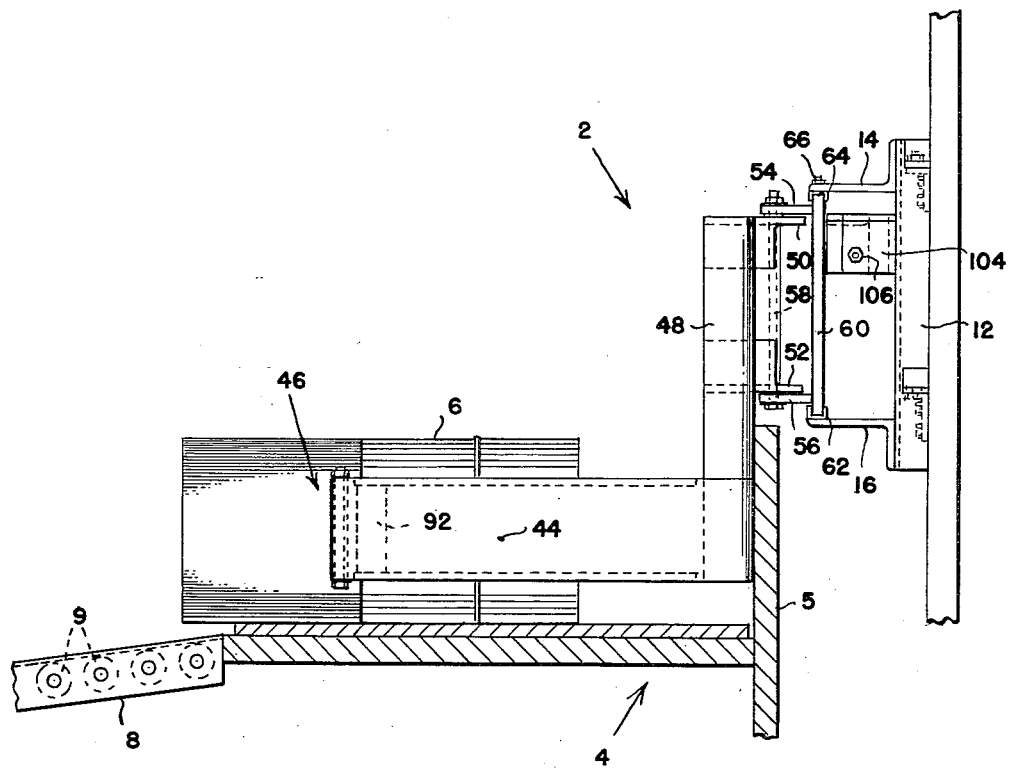
Figure 4 is a vertical elevation of the apparatus of Figure 2 viewed from the right-hand end.

Figure 3 gives a schematic showing of the manner of using the deflector in accordance with this invention. The showing of Figure 3 is a very simplified showing of a typical conveyor system for handling newspaper bundles. A chute 110 is adapted to deliver newspaper bundles to conveyor 4 where they can be deflected by deflector 2 onto roller conveyor 8 or, alternatively, they can be permitted to be conveyed further along to another discharge station.

Operation

The operation, which is readily self-evident from the prior description, will be briefly described. When it is desired to deflect a newspaper bundle 6 onto conveyor 8, valve 86 is operated to introduce compressed air into ram 72 so as to retract rod 70. In retracting, rod 70 carries slide 60 to the left, as viewed in Figure 2, which causes arms 30 and 44 to pivot about hinge bolts 38 and 58 and, where hinged, at 46. This advances the deflector arms outwardly over the conveyor and places arm 30 in a position to deflect newspaper bundle 6 onto conveyor 8. It will also be seen that, if the conveyor is reversed, deflector arm 44 will act as the deflector. When it is no longer desired to deflect newspaper bundles to conveyor 8, valve 86 is again actuated to introduce compressed air to the opposite end of ram 72 thus causing rod 70 to be extended which, in turn, results in folding deflector arms 30 and 44 inwardly against conveyor guide rail 5. This action is buffered near the end by bracket 78 engaging spring 94 and compressing it. Further buffering is accomplished when rolls 90 and 92 come into contact with guide rail 5.

It is not desired to be limited except as set forth in the following claims.

What is claimed is:

1. A deflector for use with a conveyor comprising: a deflector arm pivotally mounted at its outer end on an axis substantially perpendicular to the plane of the conveyor, a slide, a second deflector arm pivotally secured to said slide on an axis substantially perpendicular to the plane of the conveyor, the inner ends of said arms being pivotally secured together on an axis substantially perpendicular to the plane of the conveyor, means connected to said slide to advance and retract the slide to, in turn, advance and retract the deflector arms over the conveyor.

2. A deflector for use with a conveyor comprising: a deflector arm pivotally mounted at its outer end on a substantially vertical axis, a slide, a second deflector arm pivotally secured on a substantially vertical axis to said slide, the inner ends of said arms being hinged together on a substantially vertical axis, means connected to said slide to advance and retract the slide to, in turn, advance and retract the deflector arms over the conveyor.

3. A deflector for use with a conveyor comprising: a deflector arm pivotally mounted at its outer end on a substantially vertical axis, a slide, a second deflector arm pivotally secured on a substantially vertical axis to said slide, the inner ends of said arms being hinged together on a substantially vertical axis, a ram connected to said slide and adapted to advance and retract the slide to, in turn, advance and retract the deflector arms over the conveyor.

4. A deflector for use with a conveyor comprising: a ram having an axis adapted to lie in a plane substantially parallel to the plane of the conveyor, a slide connected to said ram, a deflector arm pivotally mounted at its outer end on an axis substantially perpendicular to the plane of the conveyor, a second deflector arm pivotally secured to said slide on an axis substantially perpendicular to the plane of the conveyor, the inner ends of said arms being pivotally secured together on an axis substantially perpendicular to the plane of the conveyor, said ram adapted to advance and retract said slide to, in turn, advance and retract the deflector arms over the conveyor and said ram in the fully extended position maintaining said arms at a slight angle with respect to each other.

5. A deflector for use with a conveyor comprising: a ram having an axis adapted to lie in a plane substantially parallel to the plane of a conveyor, a slide connected to said ram, a deflector arm pivotally mounted at its outer end on an axis substantially perpendicular to the plane of the conveyor, a second deflector arm pivotally secured to said slide on an axis substantially perpendicular to the plane of the conveyor, the inner ends of said arms being pivotally secured together on an axis substantially perpendicular to the plane of said conveyor, said ram adapted to advance and retract said slide to, in turn, advance and retract the deflector arms over the conveyor and spring means to buffer the action of said ram adjacent the termination of its extension stroke.

References Cited in the file of this patent

FOREIGN PATENTS 801,505     Germany _____ Jan. 8, 1951